(12) United States Patent
Shang

(10) Patent No.: US 9,869,826 B1
(45) Date of Patent: Jan. 16, 2018

(54) MAGNETIC OPTICAL FIBER COUPLING DEVICE

(71) Applicant: Hua Shang, Nanjing (CN)

(72) Inventor: Hua Shang, Nanjing (CN)

( * ) Notice: Subject to any disclaimer, the term of this patent is extended or adjusted under 35 U.S.C. 154(b) by 0 days.

(21) Appl. No.: 15/605,489

(22) Filed: May 25, 2017

Related U.S. Application Data

(63) Continuation of application No. PCT/CN2017/077655, filed on Mar. 22, 2017.

(51) Int. Cl.
*G02B 6/38* (2006.01)
*H01R 13/62* (2006.01)
*G02B 6/35* (2006.01)
*G02B 6/36* (2006.01)
(Continued)

(52) U.S. Cl.
CPC ......... *G02B 6/3886* (2013.01); *G02B 6/3572* (2013.01); *H01R 13/6205* (2013.01); *G02B 6/24* (2013.01); *G02B 6/26* (2013.01); *G02B 6/35* (2013.01); *G02B 6/3564* (2013.01); *G02B 6/3568* (2013.01); *G02B 6/36* (2013.01);
(Continued)

(58) Field of Classification Search
CPC .................... G02B 6/3886; H01R 13/6205
See application file for complete search history.

(56) References Cited

U.S. PATENT DOCUMENTS 4,690,495 A * 9/1987 Giannini ................. G02B 6/32
385/57
5,330,465 A 7/1994 Doiron et al.
(Continued)

FOREIGN PATENT DOCUMENTS

| CN | 101125099 A | 2/2008 |
|---|---|---|
| CN | 103861195 A | 6/2014 |
| CN | 205287198 U | 6/2016 |

(Continued)

OTHER PUBLICATIONS

Aug. 24, 2017 Search Report and Written Opinion issued in PCT/CN2017/077680.

*Primary Examiner* — Omar R Rojas
(74) *Attorney, Agent, or Firm* — Oliff PLC

(57) ABSTRACT

The present application relates to a magnetic optical fiber coupling device. The magnetic optical fiber coupling device comprises a plug and a socket pluggable for each other, wherein the plug comprises a first pluggable part and a first connecting part, and the socket comprises a second pluggable part and a second connecting part. Both of the first pluggable part and the second pluggable part are magnetic and have opposite magnetic properties. The first pluggable part comprises a first optical fiber complex and a tube wall disposed outside of the first optical fiber complex. The second pluggable part comprises a second optical fiber complex and a casing disposed outside of the second optical fiber complex. The coupling device of the present application has a fast speed of plugging, a long durability, a good optical fiber alignability, and a high light conductivity. Further, it can be rotated in any axial direction after connecting with each other without affecting the light conductivity. In addition, the connection by the pluggable manner or concave-convex connecting improves the stability and reliability of the coupling. Accordingly, the conductivity efficiency of the light increases greatly.

11 Claims, 4 Drawing Sheets

(51) Int. Cl.
    *G02B 6/24*          (2006.01)
    *G02B 6/26*          (2006.01)

(52) U.S. Cl.
    CPC .............. *G02B 6/38* (2013.01); *G02B 6/3807* (2013.01); *G02B 6/3873* (2013.01); *H01R 13/62* (2013.01)

(56) References Cited

U.S. PATENT DOCUMENTS

| | | | |
|---|---|---|---|
| 2010/0104244 A1* | 4/2010 | Grinderslev | G02B 6/3874 385/74 |
| 2014/0120746 A1* | 5/2014 | Persion | G02B 6/3817 439/39 |

FOREIGN PATENT DOCUMENTS

| | | |
|---|---|---|
| CN | 105749427 A | 7/2016 |
| CN | 106955423 A | 7/2017 |

\* cited by examiner

MAGNETIC OPTICAL FIBER COUPLING DEVICE

TECHNICAL FIELD

The present application relates to the technical field of the laser, in particular to a magnetic optical fiber coupling device.

BACKGROUND OF THE INVENTION

An optical fiber coupling device is an element for detachably connecting one optical fiber and another. The device precisely joints two end faces of optical fibers such that the light energy outputted from an optical fiber is maximally coupled to a receptacle optical fiber, and the light energy is involved into an optical link so as to minimize the influence caused on the system. Based on the coupled optical fibers, the optical fiber coupling device can be classified as follows: SC optical fiber coupling devices, are applied to SC optical fiber interface, which is similar with RJ-45 interface, except that the SC interface is flatter. The significant difference lies in the fact that the contact blade is different. The RJ-45 interface has eight thin copper contact blades, while the SC optical fiber interface has one copper pillar. LC optical fiber coupling devices, applied to LC optical fiber interface, are connectors connecting to SFP module and employ a modular Registered Jack (RJ) latch mechanism that is easy for operations (common in routers). FC optical fiber coupling devices, are applied to FC optical fiber interface. A metal sleeve is used as a reinforced manner. The fastening is achieved by turnbuckles. Typically, ST optical fiber coupling device is used at the ODF side (common in distribution frame). It is applied to ST optical fiber interface. It is usually used in optical fiber distribution frame, having a round shell, which is fastened by turnbuckles.

The manner of connection of the above coupling devices comprises a turnbuckle or a snap joint. A rotational mode is used when to connect so as to joint precisely. The coupling efficiency is greatly influenced by the number of rotation and strength. After many times of connection, end faces might be worn causing increased loss, lowered speed of connection, and being unable to be rotated after the connection. In order to solve the above problem, in the present application a magnetic connection is used for optical fiber coupling. Thus, a fast coupling speed and a high precision can be achieved. Further, the coupling efficiency is not influenced by manual work, and after coupling, any rotation in axial direction can be conducted. The need in the field of communication, medical treatment for easy, durable, precise, high frequent optical fiber coupling is met.

SUMMARY OF THE INVENTION

In view of the above, the object of the present application is to provide a magnetic optical fiber coupling device, so as to solve defects of the existing coupling devices that the rotation is needed to connect closely, the coupling efficiency is greatly influenced by the number of rotation and strength, after many times of connection, end faces might be worn causing increased loss, lowered speed of connection, and being unable to be rotated after the connection.

The object of the present application is achieved by the following technical solutions:

A magnetic optical fiber coupling device, comprising plug and socket pluggable for each other, the plug comprises a first pluggable part and a first connecting part connected with each other, the socket comprises a second pluggable part and a second connecting part connected with each other, a free end of the first pluggable part and a free end of the second pluggable part are connected with each other in a pluggable manner, both of the first pluggable part and the second pluggable part are magnetic;

the first pluggable part comprises a first optical fiber complex and a tube wall disposed outside of the first optical fiber complex, the second pluggable part comprises a second optical fiber complex and a casing disposed outside of the second optical fiber complex;

the opposite magnetic properties of the first pluggable part and the second pluggable part make them attracted with each other and the first optical fiber complex and the second optical fiber complex can be jointed closely.

Further, the first optical fiber complex comprises a first ferrule, a first optical fiber disposed through a core of the first ferrule for transmitting the light as well as a first sleeve wrapping the first ferrule;

the second optical fiber complex comprises a second ferrule, a second optical fiber disposed through a core of the second ferrule for transmitting the light as well as a second sleeve wrapping the second ferrule;

the outer diameter of the first optical fiber complex is the same as that of the second optical fiber complex.

Further, the casing comprises a first casing wrapping the second optical fiber complex as well as a second casing disposed outside of the first casing.

A first circular groove is disposed between the outer wall of the first casing and the inner wall of the second casing for containing the tube wall.

Further, a second circular groove is disposed between the outer wall of the first optical fiber complex and the inner wall of the tube wall for containing the first casing.

Further, the top of the second optical fiber complex is lower than the top of the first casing such that a first hallow channel is formed in the upper end of the first casing to contain the first optical fiber complex.

Further, in the first optical fiber complex, the top of the first ferrule extends to the outside of the first sleeve.

In the second optical fiber complex, the second sleeve extends to the outside of the second ferrule such that a second hallow channel is formed inside of the top of the second sleeve to contain the first ferrule extended to the outside of the first sleeve, so as to make the first ferrule and the second ferrule contact with each other closely and the first optical fiber and the second optical fiber contact with each other closely.

Further, a wear-resisting layer is disposed on the top of the first ferrule and the second ferrule.

Further, the material of the wear-resisting layer is graphene or polytetrafluoroethylene.

Further, the first pluggable part and the second pluggable part are in structures of a cylinder or an annulus. The first pluggable part takes the axis of the first optical fiber as a pivot, the second pluggable part takes the axis of the second optical fiber as a pivot.

All locations contacted with each other between the first pluggable part and the second pluggable part possess opposite magnetisms such that the first pluggable part and the second pluggable part can possess an attraction force in an axial direction and an attraction force in a side direction simultaneously.

Further, the method for forming the first pluggable part and the second pluggable part possess magnetism comprises any one of the following: a) Preparing the first pluggable part and the second pluggable part using magnetic materials, b) Magnetizing the first pluggable part and the second pluggable part by electromagnetism, c) Disposing an electromagnetic wire inside of the first pluggable part and the second pluggable part.

Further, in the process a), the magnetic material comprises any one of permanent magnet materials, soft magnetic materials, gyromagnetic materials and piezomagnetic materials. The permanent magnet material can be neodymium iron boron.

Further, in the process b), materials for preparing the first pluggable part and the second pluggable part are ceramics, metals or stainless steel.

The present application has at least the following advantageous effects:

a. The coupling device of the present application has a fast speed of plugging, a long durability, a good optical fiber alignability, and a high light conductivity. Further, it can be rotated in any axial direction after connecting with each other without affecting the light conductivity. The defects of the existing coupling devices that the rotation is needed to connect closely, the coupling efficiency is greatly influenced by the number of rotation and strength, after many times of connection, end faces might be worn causing increased loss, lowered speed of connection, and being unable to be rotated after the connection are overcome.

b. The coupling device of the present application is connected with each other by the insertion for each other or concave-convex connecting between the first optical fiber complex and the first casing, the first ferrule and butterfly sleeve as well as the first casing, the second casing and tube wall. The stability and reliability of the coupling manner increase greatly. Correspondingly, the light conductivity efficiency increase significantly.

c. Each part of the coupling device of the present application is in a structure of a cylinder or an annulus, which cannot be rotated arbitrarily. Further, they have an attraction force in a side direction, making optical fibers aligned with each other, and an attraction force in an axial direction, making both ends of the coupling device connected closely so as to align both sides of optical fibers and transmit light effectively.

d. Several manners can be used in the present application for magnetizing so as to make the corresponding structure or parts magnetic. In summary, several manners are used to align optical fibers by the coupling device of the present application, which is not only with easy to operation, but also with good alignment of optical fibers, and high conductivity of the light.

Figure 1:
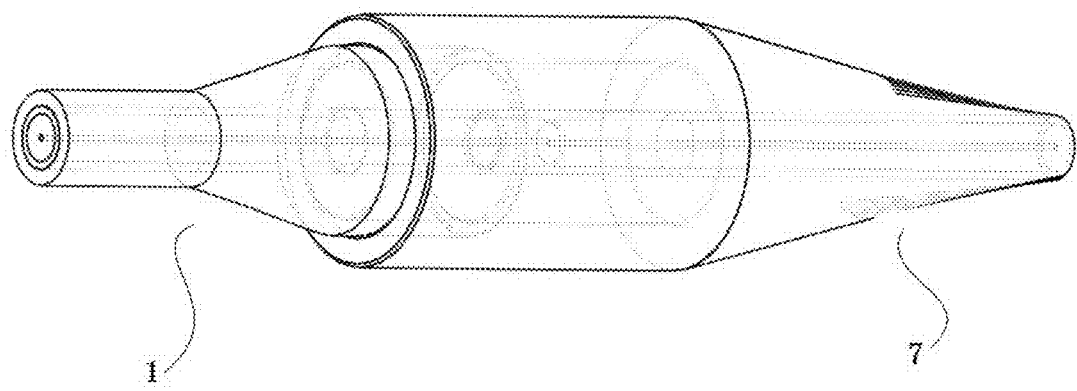
FIG. 1 is a schematic diagram of the exterior structure of a magnetic optical fiber coupling device of an embodiment of the present application.

1, the first connecting part; 2, the first pluggable part; 6, the second pluggable part; 7, the second connecting part; 21, the first optical fiber; 22, the first ferrule; 23, the first sleeve; 24, tube wall; 25, the first circular groove; 61, the second optical fiber; 62, the second ferrule; 63, the second sleeve; 64, the first casing; 65, the second casing; 66, the second hallow channel; 67, the first hallow channel; 68, the second circular groove; 69, electromagnetic wire.

DETAILED DESCRIPTION OF THE INVENTION

The technical solutions of embodiment of the present application are described clearly and completely as follows. Obviously, the described embodiments are just some not all embodiments of the present application. The protection scope of the present application is not intended to be limited by embodiments of the present application provided below, but just represent selected embodiments of the present application. Based on embodiments of the present application, other embodiments that can be obtained by those skilled in the art without paying any creative work belong to the protection scope of the the present application.

Embodiment 1

As shown in FIG. 1-FIG. 7, a magnetic optical fiber coupling device is provided, comprising a plug and a socket being pluggable for each other. The plug comprises a first pluggable part 2 and a first connecting part 1 connected with each other. The socket comprises a second pluggable part 6 and a second connecting part 7 connected with each other. A free end of the first pluggable part 2 and a free end of the second pluggable part 6 are connected with each other in a pluggable manner. Both of the first pluggable part 2 and the second pluggable part 6 are magnetic and possess opposite magnetic properties. The first pluggable part 2 comprises a first optical fiber 21 complex and a tube wall 24 disposed outside of the first optical fiber 21 complex. The second pluggable part 6 comprises a second optical fiber 61 complex and a casing disposed outside of the second optical fiber 61 complex.

The opposite magnetic properties of the first pluggable part 2 and the second pluggable part 6 make them attracted with each other and the first optical fiber 21 complex and the second optical fiber 61 complex can be jointed closely.

The first optical fiber 21 complex comprises a first ferrule 22, a first optical fiber 21 disposed through in a core of the first ferrule 22 for transmitting the light as well as a first sleeve 23 wrapping outside of the first ferrule 22. The second optical fiber 61 complex comprises a second ferrule 62, a second optical fiber 61 disposed through in a core of the second ferrule 62 for transmitting the light as well as a second sleeve 63 wrapping outside of the second ferrule 62.

The outer diameter of the first optical fiber 21 complex is the same as that of the second optical fiber 61 complex. Further, their complexes structures are also the same. That is, the parameters such as structural thicknesses of the first ferrule 22 and the second ferrule 62, the first sleeve 23 and the second sleeve 63 are the same. Thus, the first optical fiber 21 and the second optical fiber 61 can be aligned effectively so as to improve the conductivity of the light.

All locations contacted with each other between the first pluggable part 2 and the second pluggable part 6 possess opposite magnetic properties such that the first pluggable part 2 and the second pluggable part 6 can be attracted both in an axial direction and in a side direction. During the attraction, the attraction force in a side direction facilitates the alignment of optical fibers; the attraction force in an axial direction facilitates the close alignment between both sides of the coupling device so as to make the optical fibers inside the plugs and sockets align and contact with each other.

The casing comprises a first casing 64 wrapping outside of the second optical fiber 61 complex (the second sleeve 63) as well as a second casing 65 disposed outside of the first casing 64. A first circular groove 25 containing the tube wall 24 is disposed between the outer wall of the first casing 64 and the inner wall of the second casing 65 such that the first circular groove 25 and the second casing 65 are connected closely, which contributes to the alignment of optical fibers in plugs and sockets.

A second circular groove 68 containing the first casing 64 is disposed between the outer wall of the first optical fiber 21 complex and the inner wall of the tube wall 24, such that the second circular groove 68 and the first casing 64 are connoted with each other closely, which contributes to the alignment of optical fibers of plugs and sockets.

The top of the second optical fiber 61 complex (that is the free end, which is the end connected with the plug) is lower than the top of the first casing 64 (that is the free end, which is the end connected with the plug). That is, the first casing 64 extends to the second optical fiber 61 complex, such that a hallow channel 67 containing the first optical fiber 21 complex is formed inside of the upper end of the first casing 64, which similarly contributes to enhanced alignment of optical fibers of plugs and sockets, and improved stability and reliability of the coupling.

In the first optical fiber 21 complex, the top of the first ferrule 22 extends beyond the first sleeve 23. That is, the top of the first ferrule 22 partly extends beyond the first sleeve 23 or is higher than the first sleeve 23.

Correspondingly, in the second optical fiber 61 complex, the second sleeve 63 extends beyond the second ferrule 62. That is, the top of the second sleeve 63 extends beyond the second ferrule 62 or is higher than the second ferrule 62. A second hallow channel 66 is formed inside of the top of the second sleeve 63 (that is, a free end) containing parts of the first ferrule 22 extending beyond the first sleeve 23, such that the first ferrule 22 and the second ferrule 62 are contacted with each other closely as well as the first optical fiber 21 and the second optical fiber 61 are contacted with each other closely. The stability and reliability of the coupling manner are enhanced, such that the conductivity efficiency of the light is higher.

When the first optical fiber 21 complex is inserted into the first hallow channel 67, two end faces of the first sleeve 23 and the second sleeve 63 are contacted with each other closely. The top of the first ferrule 22 is inserted into the second hallow channel 66 and contacted with the second ferrule 62 closely. The first optical fiber 21 of the first ferrule 22 and the second optical fiber 61 of the second ferrule 62 are aligned and contacted with each other closely, which contributes to higher conductivity efficiency.

The top faces for contacting with the first ferrule 22 and the second ferrule 62 are coated with a wear resisting layer so as to enhance the durability. Simultaneously, the binding force between plugs and sockets can be controlled by the thickness of the wear-resisting layer.

The material of the wear-resisting layer is graphene or polytetrafluoroethylene, and the like, which could simultaneously enhance the lubricity and the abrasive resistance of the connecting parts.

As a further preferred embodiment, each top of the first sleeve 23, the second sleeve 63, the first casing 64, the second casing 65 and the tube wall 24, etc., is coated with a wear-resisting layer. The wear-resisting layer can also be graphene or polytetrafluoroethylene, which could further enhance overall durability, abrasive resistance and lubricity for many pluggable processes.

It is to be emphasized that in the present application, the first ferrule 22, the first sleeve 23 and the tube wall 24 are cylinder or annulus. Further, they are coaxial with the first ferrule 22. That is, they take axis of the first optical fiber 21 as a pivot. Similarly, the second ferrule 62, the second sleeve 63, the first casing 64 and the second casing 65, etc., are cylinder or annulus. Further, they are coaxial with the second ferrule 62. That is, they take the axis of the second optical fiber 61 as a pivot. Thus, they can be rotated arbitrarily.

Embodiment 2

Based on embodiment 1, a method for forming the first magnetic pluggable part 2 and the second magnetic pluggable part 6 comprises preparing the first pluggable part 2 and the second pluggable part 6 by magnetic materials.

The magnetic materials comprise any one of permanent magnet materials (such as neodymium iron boron), soft magnetic materials, gyromagnetic materials and piezomagnetic materials. The permanent magnet materials can be neodymium iron boron, such as neodymium iron boron of N52 type.

Embodiment 3

Based on embodiment 1, a method for forming the first magnetic pluggable part 2 and the second magnetic pluggable part 6 comprises magnetizing the prepared first pluggable part 2 and second pluggable part 6 through electromagnetism. That is, the magnetism is added in a subsequent step.

Materials for preparing the first pluggable part 2 and the second pluggable part 6 are ceramics, metals or stainless steel. These materials can be magnetized subsequently.

Embodiment 4

Figure 8:
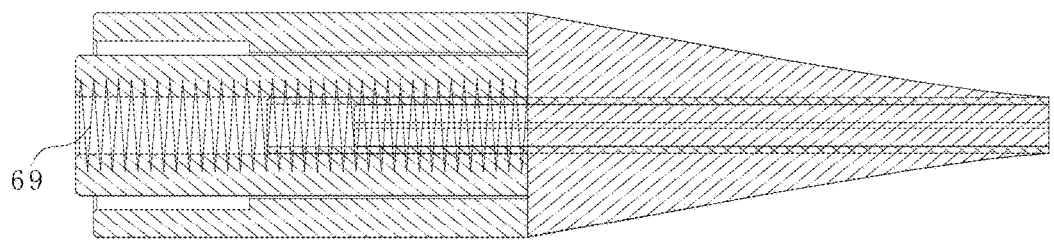
FIG. 8 is a schematic diagram of the wrapping pattern of the electromagnetic wire of an embodiment of the present application.

Based on embodiment 1, a method for forming a first magnetic pluggable part 2 and a second magnetic pluggable part 6 can be wrapping electromagnetic wire 69 inside of the first pluggable part 2 and the second pluggable part 6. The wrapping pattern of electromagnetic wire 69 can be seen in FIG. 8.

An electromagnet is used to form a magnetic attractive structure. Thin electromagnetic wire is wrapped on a magnetic material. Magnetism is generated by a direct current. By this way, the magnetic attraction can be controlled so as to automatically control the coupling/uncoupling.

An electromagnetism material can be formed by wrapping the first ferrule 22 and the second ferrule 62 with coils, etc. Specifically, a space outside of the first ferrule 22 and the second ferrule 62 can be reserved. When needed, an electromagnetic wire can be warped, such that the first ferrule 22 and the second ferrule 62, etc., are magnetic. Certainly, if it can be determined that this magnetization is used at first, during the preparation of the coupling device of the present application, the electromagnetic wire can be wrapped.

In the present application, in order to explain the structure of the coupling device in detail, the following embodiment is shown taking a multimode optical fiber coupling device as an example. The diameter of the first optical fiber 21 and the second optical fiber 61 is 300 μm. The diameter of the first ferrule 22 and the second ferrule 62 is 3 mm. The first ferrule 22 and the second ferrule 62 can be ceramics ferrule. Wear-resisting graphene materials are coated on the top of the first ferrule 22 and the second ferrule 62. The first ferrule 22 and the second ferrule 62 are strengthened and protected by the first sleeve 23 and the second sleeve 63 in stainless steel. The outer radius of the first casing 64 is 5 mm. The inner radius of tube wall 24 is 5 mm. When coupling, the plug and socket are inserted into each other, and the first casing 64 and tube wall 24 are attracted with each other so as to be connected automatically. Simultaneously, the first optical fiber 21 and the second optical fiber 61 are aligned. Finally, the coupling is achieved. After coupling, since there is no mechanical rigid connection between the plug and the socket, they can be rotated in axial direction at any degree. If the uncoupling is needed, a tensile force greater than the magnetic force between the plug and the socket can be applied to make the plug and the socket separate quickly.

Specifically, materials for forming each part of the first pluggable part 2 and the second pluggable part 6 can be ceramics, metals or stainless steel, and the like (the optical fiber is excluded). Materials can be selected according to actual needs.

Figure 2:
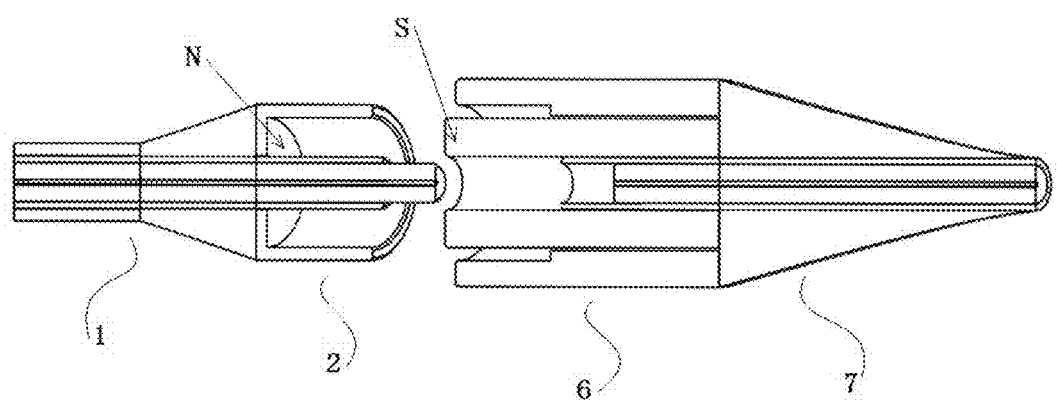
FIG. 2 is a schematic diagram of the whole structure of a magnetic optical fiber coupling device of an embodiment of the present application.
Figure 3:
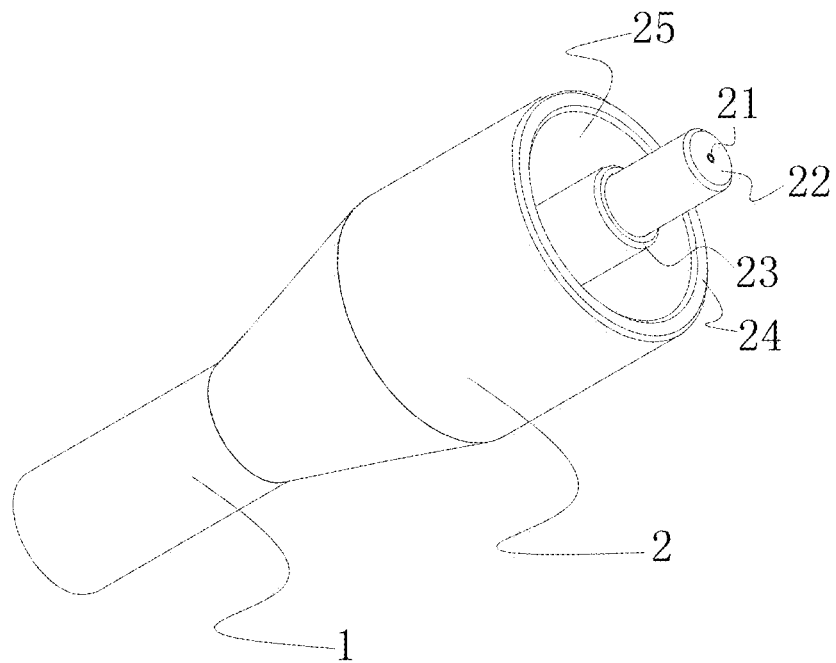
FIG. 3 is a schematic diagram of a spatial structure of a plug of an embodiment of the present application.
Figure 4:
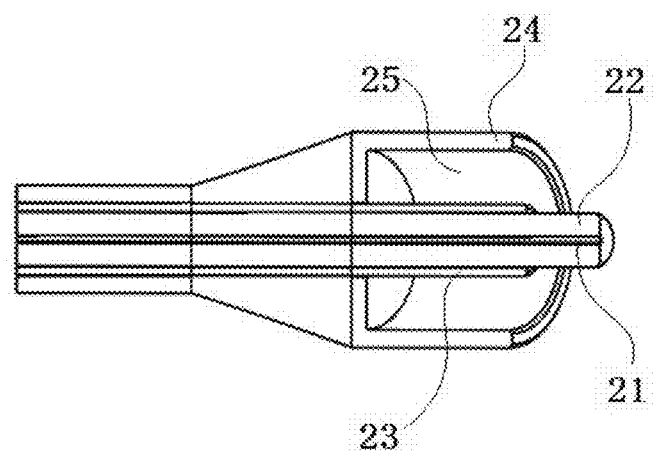
FIG. 4 is a cross section schematic diagram of a plug of an embodiment of the present application.
Figure 5:
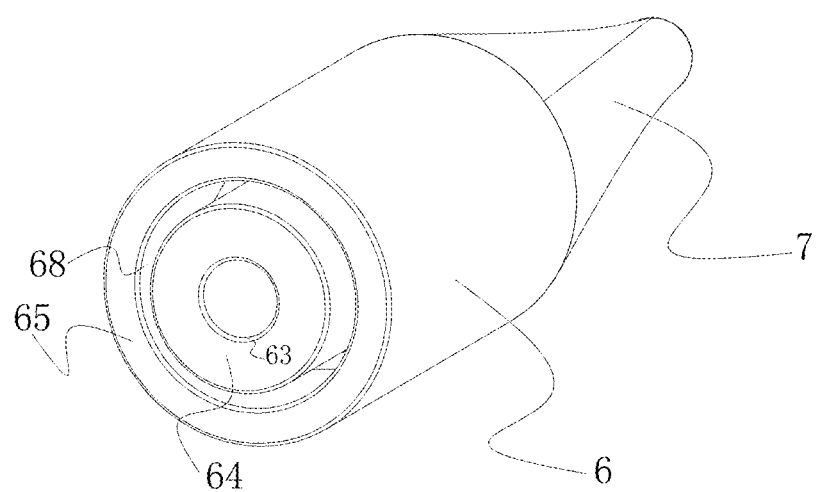
FIG. 5 is the spatial structure schematic diagram of a socket of an embodiment of the present application.
Figure 6:
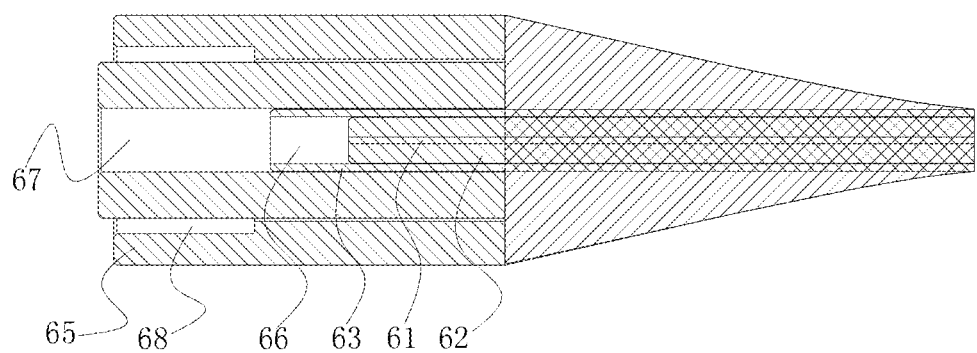
FIG. 6 is a right sectional view of the socket of an embodiment of the present application.
Figure 7:
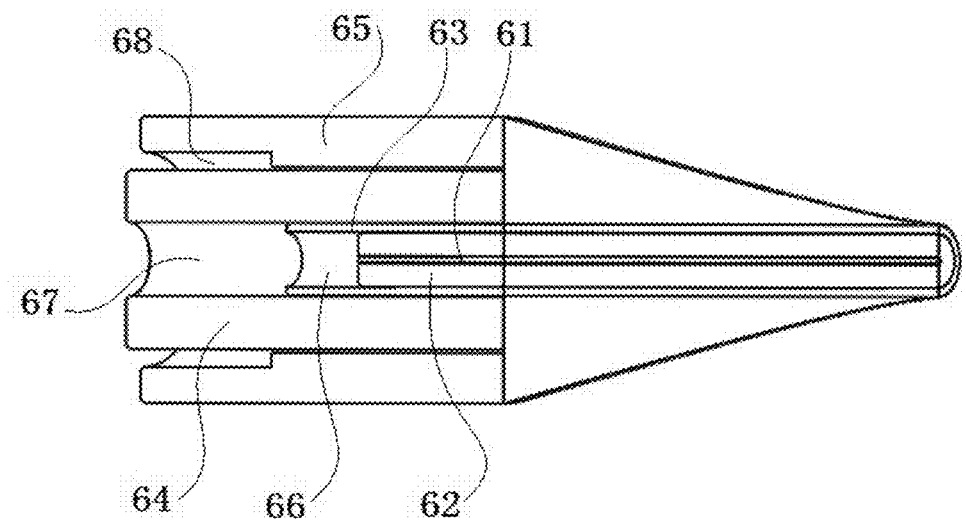
FIG. 7 is an cross sectional view of the socket an embodiment of the present application.

In the present application, materials can be magnetic except for optical fibers (that is, the first optical fiber 21 and the second optical fiber 61). At least one of the first ferrule 22, the first sleeve 23 and the tube wall 24 is magnetic. If the first ferrule 22 is magnetic, the second ferrule 62 is also magnetic and possesses the opposite magnetic property such that the first ferrule 22 and the second ferrule 62 can be attracted and connected closely with each other. If the first sleeve 23 is magnetic, the second sleeve 63 is also magnetic and possesses opposite magnetic property such that the first sleeve 23 and the second sleeve 63 can be attracted and connected closely with each other. If the tube wall 24 is magnetic, the second circular groove 68 is also magnetic, and each contact surface possesses opposite magnetic property to tube wall 24 such that they can be attracted to the tube wall 24 and connected closely. Preferably, the first ferrule 22, the first sleeve 23 and tube wall 24 are all magnetic. Certainly, just the key part can be magnetized according to the actual needs. For example, as shown in FIG. 2, the first casing 64 is formed from N52 neodymium iron boron material. The polarity of the top is S. The bottom of the second circular groove 68 is formed from N52 neodymium iron boron material, and the polarity is N such that they both can be attracted with each other and aligned.

In the present application, the first sleeve 23, the second sleeve 63, the wall tube, the first casing 64, and the second casing 65, etc., are all annulus. If magnetic annulus is used, when to be aligned, the annulus magnet possesses an attraction force in a side direction to drag optical fiber be aligned. The attraction force in an axial direction makes both ends of the coupling device connected closely. In addition, when two magnets formed from N52 neodymium iron boron material with the outer diameter of 2 mm, inner diameter of 0.5 mm and a length of 5 mm, are attracted to each other closely, the magnetic attraction force can be up to about 1.51N (0.154 Kg), which is enough to make the optical fiber connected closely.

Specifically, the free ends of the first connecting part 1 and the second connecting part 7 can be connected with the optical fiber. Then, the light inside one optical fiber can be transmitted into another optical fiber by the coupling device of the present application. For example, the light inside the optical fiber connected with the socket (that is, the second connecting part 7) can be transmitted into the optical fiber connected with the plug (that is, the first connecting part 1). For the present applicant, the coupling device of the present application can be used together with the tunable laser device emitting a laser in an earlier application (the application number is 2016214582394 and 2016112369942) as well as a blood vessel optical fiber guide wire (the application number is 201611234625X and 2016214560291). That is, the laser device can be connected to beam combiner. Then, the beam combiner can be connected to the second connecting part 7 of a socket. The blood vessel optical fiber guide wire is connected to the first connecting part 1 of a plug. The connection between the plug and the socket make the light emitted in laser device can be transmitted into the blood vessel optical fiber guide wire by the coupling device of the present application. Thus, the radiation treatment can be performed inside of human body.

The above is just some preferable embodiments of the present application, rather than the limitation to the present application. For those skilled in the art, various of modifications and changes could be made in the present application. Any modifications, equivalents, and improvements without departing from the spirit and principle of the present application should fall into the protection scope of the present application.

The invention claimed is:

1. A magnetic optical fiber coupling device, comprising a plug and a socket being pluggable for each other, the plug including a first pluggable part and a first connecting part connected with each other, the socket including a second pluggable part and a second connecting part connected with each other, a free end of the first pluggable part and a free end of the second pluggable part being connected with each other in a pluggable manner, wherein
both of the first pluggable part and the second pluggable part are magnetic;
the first pluggable part comprises a first optical fiber complex and a tube wall disposed outside of the first optical fiber complex;
the second pluggable part comprises a second optical fiber complex and a casing disposed outside of the second optical fiber complex;
the first pluggable part and the second pluggable part have opposite magnetic properties and are thus attracted to each other thereby enabling the first optical fiber complex and the second optical fiber complex to be jointed closely;
the casing comprises a first casing wrapping the second optical fiber complex and a second casing disposed outside of the first casing; and
a first circular groove is disposed between an outer wall of the first casing and an inner wall of the second with the tube wall inserted into the first groove.

2. The magnetic optical fiber coupling device according to claim 1, wherein
the first optical fiber complex comprises a first ferrule, a first optical fiber disposed through a core of the first ferrule for transmitting light, and a first sleeve wrapping the first ferrule;
the second optical fiber complex comprising a second ferrule, a second optical fiber disposed through a core of the second ferrule for transmitting light, and a second sleeve wrapping the second ferrule; and an outer diameter of the first optical fiber complex is the same as that of the second optical fiber complex.

3. A magnetic optical fiber coupling device, comprising a plug and a socket being pluggable for each other, the plug including a first pluggable part and a first connecting part connected with each other, the socket including a second pluggable part and a second connecting part connected with each other, a free end of the first pluggable part and a free end of the second pluggable part being connected with each other in a pluggable manner, wherein both of the first pluggable part and the second pluggable part are magnetic;

the first pluggable part comprises a first optical fiber complex and a tube wall disposed outside of the first optical fiber complex;

the second pluggable part comprises a second optical fiber complex and a casing disposed outside of the second optical fiber complex;

the first pluggable part and the second pluggable part opposite magnetic properties and are thus attracted to each other thereby enabling the first optical fiber complex and the second optical fiber complex to be jointed closely, wherein the first optical fiber complex comprises a first ferrule, a first optical fiber disposed through a core of the first ferrule for transmitting light, and a first sleeve wrapping the first ferrule;

the second optical fiber complex comprising a second ferrule, a second optical fiber disposed through a core of the second ferrule for transmitting light, and a second sleeve wrapping the second ferrule;

an outer diameter of the first optical fiber complex is the same as that of the second optical fiber complex; and the casing comprises a first casing wrapping the second optical fiber complex and a second casing disposed outside of the first casing, and a first circular groove is disposed between an outer wall of the first casing and an inner wall of the second casing for containing the tube wall.

4. The magnetic optical fiber coupling device of claim 3, wherein a second circular groove is disposed between an outer wall of the first optical fiber complex and an inner wall of the tube wall for containing the first casing.

5. The magnetic optical fiber coupling device of claim 4, wherein a top of the second optical fiber complex is lower than a top of the first casing such that a first hollow channel is formed in an upper end of the first casing to contain the first optical fiber complex.

6. The magnetic optical fiber coupling device of claim 5, wherein in the first optical fiber complex, a top of the first ferrule extends outside of the first sleeve, in the second optical fiber complex, the second sleeve extends outside of the second ferrule, such that a second hallow channel is formed inside of a top of the second sleeve to contain the first ferrule extended outside of the first sleeve, so as to make the first ferrule and the second ferrule contact with each other closely and the first optical fiber and the second optical fiber contact with each other closely.

7. The magnetic optical fiber coupling device of claim 6, wherein a wear-resisting layer is disposed on the top of the first ferrule and the second ferrule.

8. The magnetic optical fiber coupling device of claim 7, wherein the wear-resisting layer is made of graphene or polytetrafluoroethylene.

9. The magnetic optical fiber coupling device of claim 8, wherein the first pluggable part and the second pluggable part are in structures of a cylinder or an annulus, the first pluggable part takes an axis of the first optical fiber as a pivot, the second pluggable part takes an axis of the second optical fiber as a pivot, all locations in contact with each other between the first pluggable part and the second pluggable part possess opposite magnetisms such that the first pluggable part and the second pluggable part can possess an attraction force in an axial direction and an attraction force in a side direction simultaneously.

10. The magnetic optical fiber coupling device of claim 3, the first pluggable part and the second pluggable part being formed by any one of the following: a) Preparing the first pluggable part and the second pluggable part using magnetic materials, b) Magnetizing the first pluggable part and the second pluggable part by electromagnetism, c) Disposing an electromagnetic wire inside of the first pluggable part and the second pluggable part.

11. The magnetic optical fiber coupling device of claim 1, wherein:

a second circular groove is disposed between an outer wall of the first optical fiber complex and an inner wall of the tube wall with the first casing inserted into the second groove.

* * * * *